United States Patent
Lee et al.

(10) Patent No.: US 8,019,212 B2
(45) Date of Patent: Sep. 13, 2011

(54) OPTICAL MODULE FOR A PHOTOGRAPHING APPARATUS AND PHOTOGRAPHING APPARATUS HAVING THE SAME

(75) Inventors: Sang-geol Lee, Uiwang-si (KR); Jong Jeon, Uiwang-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 688 days.

(21) Appl. No.: 11/820,898

(22) Filed: Jun. 21, 2007

(65) Prior Publication Data

US 2008/0056698 A1 Mar. 6, 2008

(30) Foreign Application Priority Data

Sep. 4, 2006 (KR) ........................ 10-2006-0084846

(51) Int. Cl.
*G03B 17/00* (2006.01)
(52) U.S. Cl. .......................... 396/85; 359/695
(58) Field of Classification Search .................. 396/85, 396/133, 152, 379, 385; 348/240.1
See application file for complete search history.

(56) References Cited

U.S. PATENT DOCUMENTS

| | | | | |
|---|---|---|---|---|
| 4,958,178 A * | 9/1990 | Yoshida et al. | ................. | 396/85 |
| 5,339,126 A * | 8/1994 | Shimose | .......................... | 396/85 |
| 5,636,039 A * | 6/1997 | Tanno et al. | .................. | 358/474 |
| 5,765,047 A * | 6/1998 | Miyamoto et al. | .............. | 396/62 |
| 5,790,908 A * | 8/1998 | Matsuda | ....................... | 396/379 |
| 5,848,302 A * | 12/1998 | Machida | ......................... | 396/60 |
| 5,937,215 A * | 8/1999 | Mogamiya | ..................... | 396/85 |
| 6,434,331 B1* | 8/2002 | Araoka et al. | .................. | 396/72 |
| 6,618,212 B2* | 9/2003 | Chikami et al. | ............. | 359/699 |
| 6,710,936 B2* | 3/2004 | Min et al. | ...................... | 359/696 |
| 7,123,423 B2* | 10/2006 | Takahashi et al. | ............ | 359/698 |
| 7,248,419 B2* | 7/2007 | Takahashi et al. | ............ | 359/698 |
| 7,307,797 B2* | 12/2007 | Yoshitsugu et al. | ......... | 359/689 |
| 7,440,023 B2* | 10/2008 | Ueyama | ........................ | 348/371 |
| 7,567,284 B2* | 7/2009 | Ikemachi et al. | ............. | 348/335 |
| 2005/0036056 A1* | 2/2005 | Ikemachi et al. | ............. | 348/335 |
| 2005/0052536 A1* | 3/2005 | Higuchi et al. | ......... | 348/207.99 |
| 2005/0185947 A1* | 8/2005 | Honda et al. | .................. | 396/133 |
| 2006/0158546 A1* | 7/2006 | Hirai | .............................. | 348/335 |
| 2006/0285841 A1* | 12/2006 | Masui et al. | .................... | 396/72 |

* cited by examiner

*Primary Examiner* — Clayton E Laballe
*Assistant Examiner* — Linda Smith
(74) *Attorney, Agent, or Firm* — Drinker Biddle & Reath LLP (57) ABSTRACT

An optical module for a photographing device includes a fixed lens group member arranged along a first optical axis direction that faces an object, a reflection member arranged in the rear of the fixed lens group member and outputting an image light in a second optical axis direction perpendicular to the first optical axis direction by reflecting incident image light. The optical module further includes first and second lens groups and a zoom motor for providing power to change a distance between the first and second lens group members. Thus, the optical module has an efficiently configured structure.

22 Claims, 12 Drawing Sheets

OPTICAL MODULE FOR A PHOTOGRAPHING APPARATUS AND PHOTOGRAPHING APPARATUS HAVING THE SAME

CROSS-REFERENCE TO RELATED PATENT APPLICATIONS

This application claims the benefit of Korean Patent Application No. 10-2006-0084846, filed on Sep. 4, 2006, in the Korean Intellectual Property Office, the disclosure of which is incorporated herein in its entirety by reference.

BACKGROUND OF THE INVENTION

1. Field of the Invention

The present invention relates to an optical module for a photographing apparatus. More particularly, the present invention relates to an optical module for a photographing apparatus having a simple, efficiently configured structure.

2. Description of the Related Art

Photographing apparatus such as digital still cameras and digital video cameras are widely used. These type of photographing apparatus generally include an optical system having a lens unit, an imaging device arranged at a side of the lens unit, an image processing unit processing an electric signal received from the imaging device, and a memory storing a photographed image.

In the operation of the photographing apparatus, when a photographer photographs an object, image light of the object passes through the lens unit is incident on the imaging device such as a CCD (charge coupled device). The imaging device converts incident image light to an electric image signal. The image processing unit processes the image signal. The memory stores the photographed image. Thus, the photographing is complete.

For the convenience of a user, a zoom lens optical system is used to photograph an object at a wide angle or zoom in a remote object. The zoom lens optical system has a mechanical structure to change the distance between zoom lens groups constituting the zoom lens optical system, thereby performing a multiplication change function.

In a conventional zoom lens optical system, a solid cam (3D cam) formed on a cylindrical barrel is generally provided as a mechanical structure to change the distance between the zoom lens groups. However, the solid cam is difficult to manufacture and is time consuming and costly to assemble. Also, the conventional system typically includes a structure in which the zoom lens groups move along the solid cam in the barrel during a zoom operation. Thus, the positions at which a zoom motor and a focusing motor can be arranged around the solid cam are limited, thus making it difficult to efficiently use the space in the barrel and increasing the overall size of an overall optical module.

SUMMARY OF THE INVENTION

An embodiment of the present invention provides an optical module for a photographing apparatus having a simple, efficiently configured. The optical module includes a fixed lens group member arranged along a first optical axis direction that faces an object, a reflection member arranged in the rear of the fixed lens group member and outputting an image light in a second optical axis direction perpendicular to the first optical axis direction by reflecting incident image light, a first lens group member including a first lens group arranged along the second optical axis direction and a first edge unit supporting the first lens group and having a first guide protrusion. The optical module also includes a second lens group member including a second lens group arranged separated from the first lens group along the second optical axis direction and a second edge unit supporting the second lens group and having a second guide protrusion, and a zoom motor providing power to change a distance between the first and second lens group members. The optical module further includes a plane cam member including a gear unit formed in a part of an edge to receive the power from the zoom motor, a first cam slot in which the first guide protrusion is inserted to slide therein so as to move the first lens group member, a second cam slot in which the second guide protrusion is inserted to slide therein so as to move the second lens group member, and a frame where the plane cam member is installed.

The first and second guide protrusions may be formed in the same direction. A shutter may be installed on the second lens group member, and an iris may be installed on the second lens group member.

At least one power transmission gear to transmit power may be arranged between a shaft of the zoom motor and the gear unit. The power transmission gear may comprise one selected from a group consisting of a worm gear, a bevel gear, a spur gear, and a helical gear. The zoom motor may be arranged in the rear of the reflection member with respect to the first optical axis direction. The shaft of the zoom motor may be arranged in a direction perpendicular to the first and second optical axis directions.

The optical module may also comprise at least one guide rod arranged parallel to the second optical axis direction, a first guide groove formed at the first edge unit to be inserted around the guide rod capable of sliding, and a second guide groove formed at the second edge unit to be inserted around the guide rod capable of sliding, to guide the first and second lens group members to move in the second optical axis direction. The optical module may further comprise at least one guide rod arranged parallel to the second optical axis direction, a first guide hole formed at the first edge unit to be inserted around the guide rod capable of sliding, and a second guide hole formed at the second edge unit to be inserted around the guide rod capable of sliding, to guide the first and second lens group members to move in the second optical axis direction.

The first cam slot may have a shape of "U". The second cam slot may have a shape of an arc having a predetermined curvature. The plane cam member may be installed on the frame in a hinge structure to perform a rotational motion during a zoom operation, or the plane cam member may be installed on the frame in a structure capable of sliding to perform a sliding motion during a zoom operation. A direction perpendicular to a plane of the plane cam member may face an object to be photographed. A third lens group member assisting a zoom operation and transferred by a device separate from the zoom motor may be additionally arranged in the rear of the second lens group member with respect to the second optical axis direction.

A photographing device may comprise the optical module described above.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE EMBODIMENTS

Figure 1:
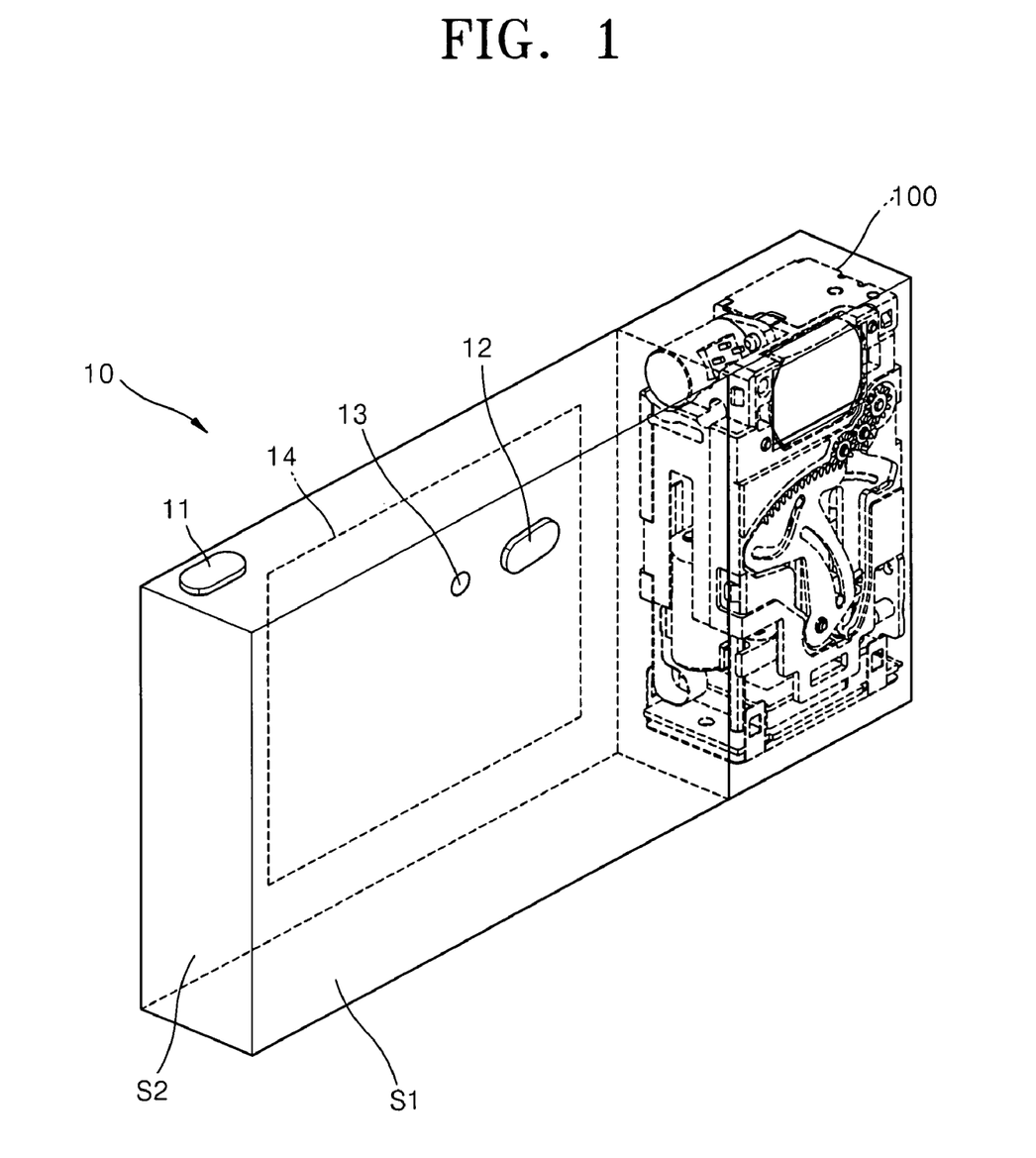
FIG. 1 is a perspective view showing an optical module according to an embodiment of the present invention arranged in a photographing apparatus.

FIG. 1 is a perspective view showing an optical module according to an embodiment of the present invention is arranged in a photographing apparatus. Referring to FIG. 1, a photographing apparatus 10 according to an embodiment of the present invention has a slim structure in which the width of a front surface S1 is larger than the width of a side surface S2. A shutter switch 11 is provided on the upper surface of the photographing device 10. The photographing device 10 has a flash 12 and an auxiliary light unit 13 on the front surface S1 and an LCD display unit 14 on the rear surface. An optical module 100 is provided at one side of the photographing apparatus 10. An object is arranged in front of the photographing apparatus 10. The optical module 100 photographs the object and inputs an image light of the object to an internal imaging device.

Referring to FIGS. 2, 3, 4, and 5, the optical module 100 for a photographing device according to an embodiment of the present embodiment includes a first lens group member 110, a second lens group member 120, a zoom motor 130, a plane cam (2D cam) cam member 140, a fixed lens group member 150, a reflection member 160, and a frame 196. A zoom operation is embodied by the first lens group member 110, the second lens group member 120, the zoom motor 130, and the plane cam member 140. In the description of the zoom operation, a first optical axis direction L1 is a direction facing an object and a second optical axis direction L2 is a direction perpendicular to the first optical axis and penetrating a first lens group 111 and a second lens group 121.

The first lens group member 110 includes the first lens group 111 and a first edge unit 112. The first lens group 111 includes at least one lens and is arranged along the second optical axis direction L2. The first edge unit 112 encompasses and supports the first lens group 111. An extended unit 112a is provided at a side of the first edge unit 112. A first guide protrusion 112b is formed at an end portion of the extended unit 112a. According to an embodiment of the present embodiment, although the first edge unit 112 includes the extended unit 112a and the first guide protrusion 112b is formed on the extended unit 112a, the first edge unit 112 may not include the extended unit 112a and the first guide protrusion 112b may be formed directly on the first edge unit 112.

A first guide groove 113a and a first guide hole 113b are formed in the first edge unit 112. Although the first guide groove 113a and the first guide hole 113b are formed in the first edge unit 112, as another first guide groove is formed instead of the first guide hole 113b at the position of the first guide hole 113b of the first edge unit 112, the first guide grooves can be formed in the first edge unit 112. Also, as another first guide hole is formed instead of the first guide groove 113a at the position of the first guide groove 113a of the first edge unit 112, the first guide holes only can be formed in the first edge unit 112. That is, since the first guide groove 113a or the first guide hole 113b is inserted around a guide rod 195 to perform a function of guiding the first edge unit 112 along the second optical axis direction L2, either the first guide groove 113a or the first guide hole 113b can be compatibly arranged.

The second lens group member 120 is arranged separated from the first lens group member 110 along the second optical axis direction L2. The second lens group member 120 includes the second lens group 121 and a second edge unit 122. The second lens group 121 includes at least one lens and is arranged along the second optical axis direction L2. The second edge unit 122 encompasses and supports the second lens group 121. An extended unit 122a is provided at a side of the second edge unit 122. A second guide protrusion 122b is formed at an end portion of the extended unit 122a. Although the second edge unit 122 includes the extended unit 122a and the second guide protrusion 122b is formed on the extended unit 122a, the second edge unit 122 may not include the extended unit 122a and the second guide protrusion 122b may be formed directly on the second edge unit 122.

A second guide groove 123a and a second guide hole 123b are formed in the second edge unit 122. Although the second guide groove 123a and the second guide hole 123b are formed in the second edge unit 122, as another second guide groove is formed instead of the second guide hole 123b at the position of the second guide hole 123b of the second edge unit 122, the second guide grooves can be formed in the second edge unit 122. Also, as another second guide hole is formed instead of the second guide groove 123a at the position of the second guide groove 123a of the second edge unit 122, the second guide holes can be formed in the second edge unit 122. That is, since the second guide groove 123a or the second guide hole 123b is inserted around the guide rod 195 to perform a function of guiding the second edge unit 122 along the second optical axis direction L2, either the second guide groove 123a or the second guide hole 123b can be compatibly arranged.

The zoom motor 130 is arranged in near of the reflection member 160 and the zoom motor 130 provides power to change a distance between the first lens group member 110 and the second lens group member 120. The zoom motor 130 is arranged in the rear of the reflection member 160 with respect to the first optical axis direction L1 and a shaft 130a of the zoom motor 130 is arranged perpendicular to the first and second optical axis directions L1 and L2. Also, the size of the diameter of the zoom motor 130 is less than the height of the fixed lens group member 150 that is described later. The size and arrangement structure of the zoom motor 130 can minimize the volume of the optical module 100, which enables the efficient use of a space.

The plane cam member 140 has a plane plate structure. A gear unit 141 is formed at a side of an edge portion of the plane cam member 140 and a first cam slot 142 and a second cam slot 143 are formed at the center portion thereof. A rotation center hole 144 is formed around the second cam slot 143. As the plane of the plane cam member 140 is arranged to perpendicularly face the object to be photographed, the volume of the optical module 100 can be minimized.

The gear unit 141 has a predetermined pitch circle and has an involute teeth shape. The length of the gear unit 141 is appropriately determined by a designer according to the rotation available angle of the plane cam member 140.

The gear unit 141 in this example has a predetermined pitch circle and the involute teeth shape, but there shape of the gear unit 141 or the shape of teeth forming the gear unit 141 can have any suitable shape. In other words, the gear unit 141 is shaped to receive power from the zoom motor 130 to perform the rotation motion of the plane cam member 140. For example, the gear unit may have a rack gear shape or a cycloid teeth shape.

The first cam slot 142 in this example has a U shape so that the first guide protrusion 112b is inserted to slide therein. The second cam slot 143 has an arc shape having a predetermined curvature so that the second guide protrusion 122b is inserted to slide therein, but it is also sufficient that the first and second cam slots 142 and 143 are formed to perform a necessary zoom operation as the distance between the first lens group member 110 and the second lens group member 120 appropriately changes according to the rotation of the plane cam member 140. There is no specific shape of the first and second cam slots 142 and 143. That is, a designer determines the amount of change in distance between the first and second lens group members 110 and 120 that is needed for the zoom operation and the curvature and shape of the first and second cam slots 142 and 143 according to the amount of change in distance.

The rotation center hole 144 is a position of the center of the rotation of the plane cam member 140. That is, a hinge coupling is made as a fixing pin 196a of the frame 196 is inserted in the rotation center hole 144, so that the plane cam member 140 rotates around the position of the rotation center hole 144.

Figure 2:
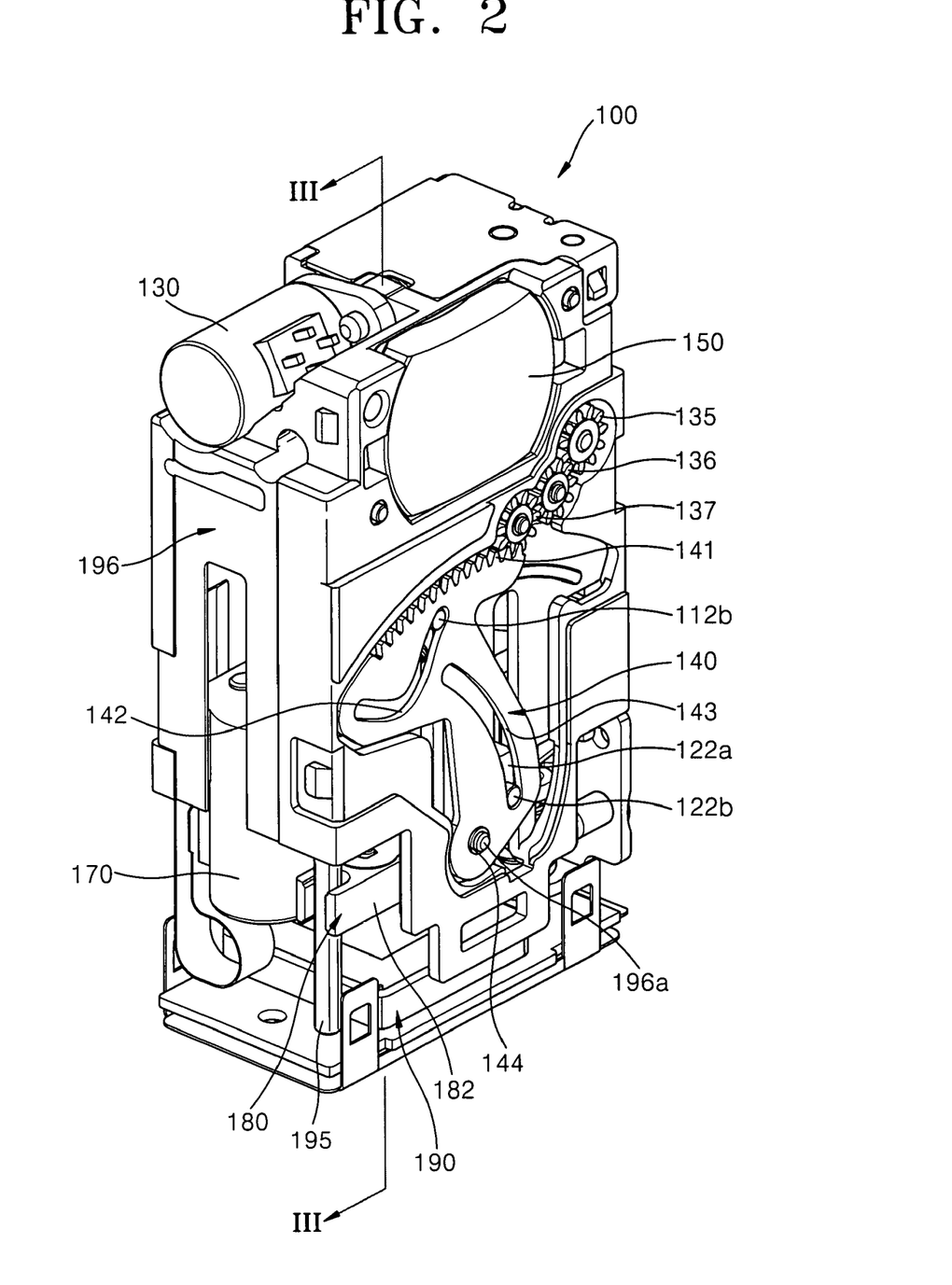
FIG. 2 is a perspective view of the optical module according to an embodiment of the present invention.
Figure 3:
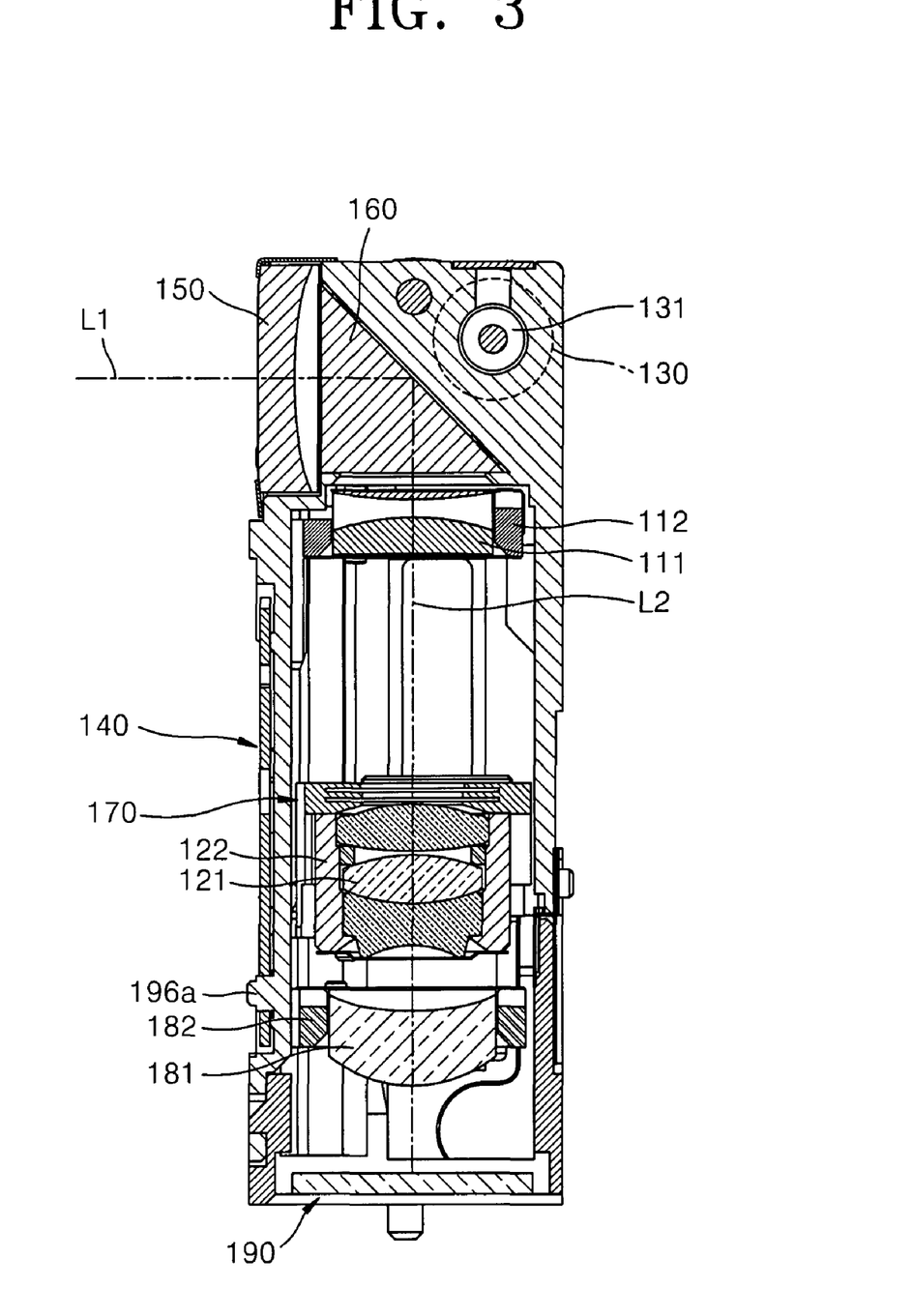
FIG. 3 is a cross-sectional view taken along line III-III of FIG. 2.
Figure 4:
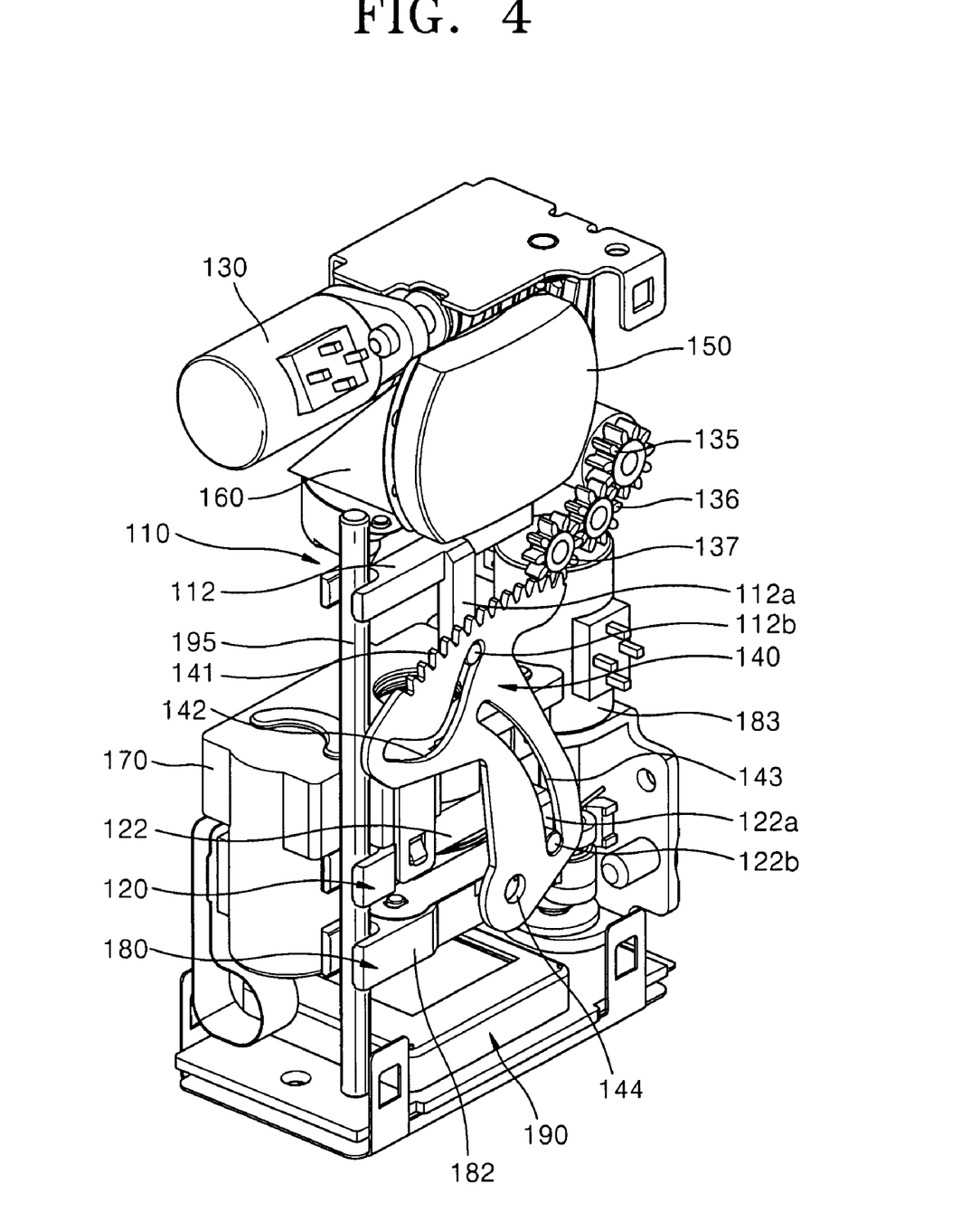
FIG. 4 is a perspective view of the optical module according to an embodiment of the present invention in which a frame is removed.
Figure 5:
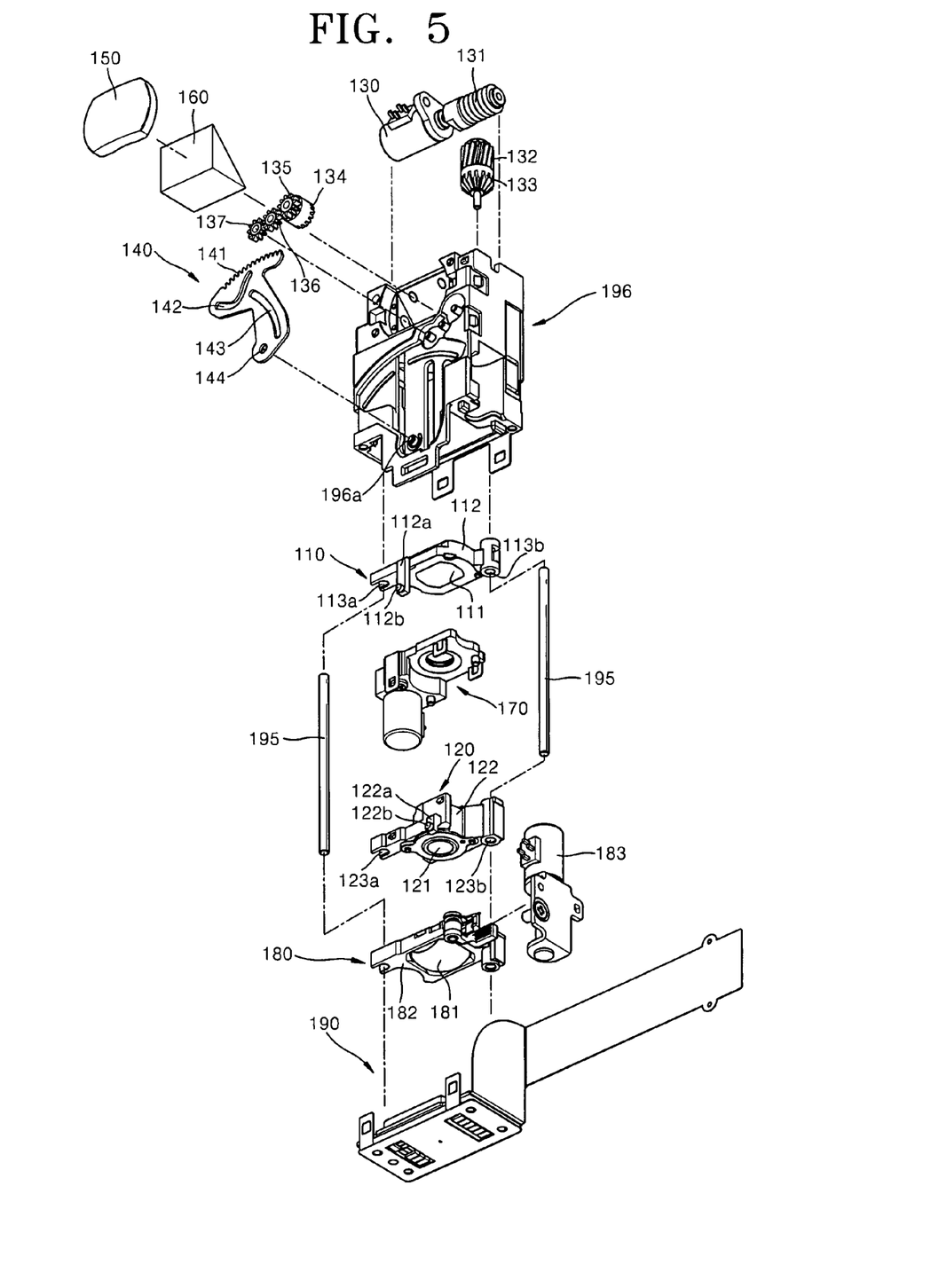
FIG. 5 is an exploded perspective view of the optical module according to an embodiment of the present invention.

As shown in FIGS. 2, 3, and 4, the fixed lens group member 150 is arranged above the optical module 100 according to the present embodiment, that is, above the first lens group member 110, along the first optical axis direction L1. Also, the reflection member 160 to reflect the photographed image light to proceed toward the first lens group 111 arranged in the second optical axis direction L2 is arranged in the rear of the fixed lens group member 150. The reflection member 160 is formed of a prism or reflection mirror and reflects the incident image light by changing the angle of the incident image light.

Also, a shutter and iris assembly 170 performing functions of a shutter and a light exposure amount adjustment is installed on the upper surface of the second lens group member 120 to be capable of moving with the second lens group member 120. A third lens group member 180 is arranged along the second optical axis direction L2 under the optical module 100 according to the present embodiment, that is, under the second lens group member 120, and an imaging device member 190 is arranged under the third lens group member 180.

The third lens group member 180 includes a third lens group 181, a third edge unit 182, and a third lens group drive motor 183 and performs a function of assisting the zoom operation by processing the image light. Also, the third lens group member 180 performs an auto focus function and a function of a focusing lens group member.

According to this example, the third lens group member 180 assists the zoom operation while transferred by a drive device separate from that for the first and second lens group members 110 and 120. However, it is possible to achieve the zoom operation with only the first and second lens group members 110 and 120.

An imaging device is installed on the imaging device member 190. A CCD (charge coupled device) or CMOS (complementary metal oxide semiconductor) can be used as the imaging device and other image sensor can be used therefor. The guide rod 195 is installed on the frame 196 parallel to the second optical axis direction L2 and in the present embodiment two guide rods 195 are installed symmetrically to the left and right. The guide rod 195 is inserted in the first guide groove 113a, the first guide hole 113b, the second guide groove 123a, and the second guide hole 123b so as to guide the first and second lens group members 110 and 120 to move along the second optical axis direction L2.

Although in this example the number of the guide rod 195 is described to be two there is no limit to the number of the guide rods 195 that can be used. For example, the number of the guide rod 195 according to the present invention may be one, three, or four, or any other suitable number.

Figure 6:
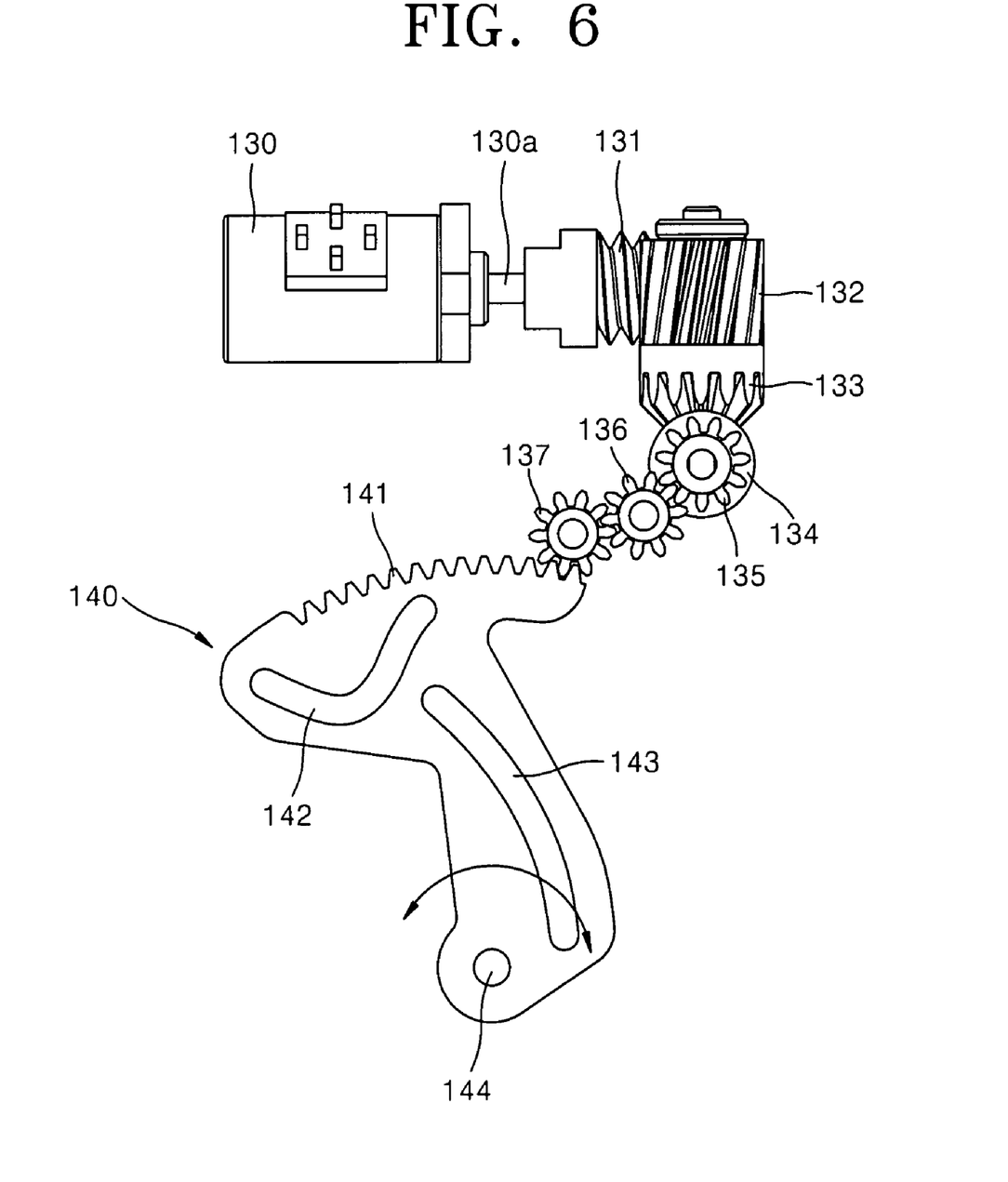
FIG. 6 is a front view showing a zoom motor, a gear train, and a plane cam member of the optical module according to an embodiment of the present invention.
Figure 7:
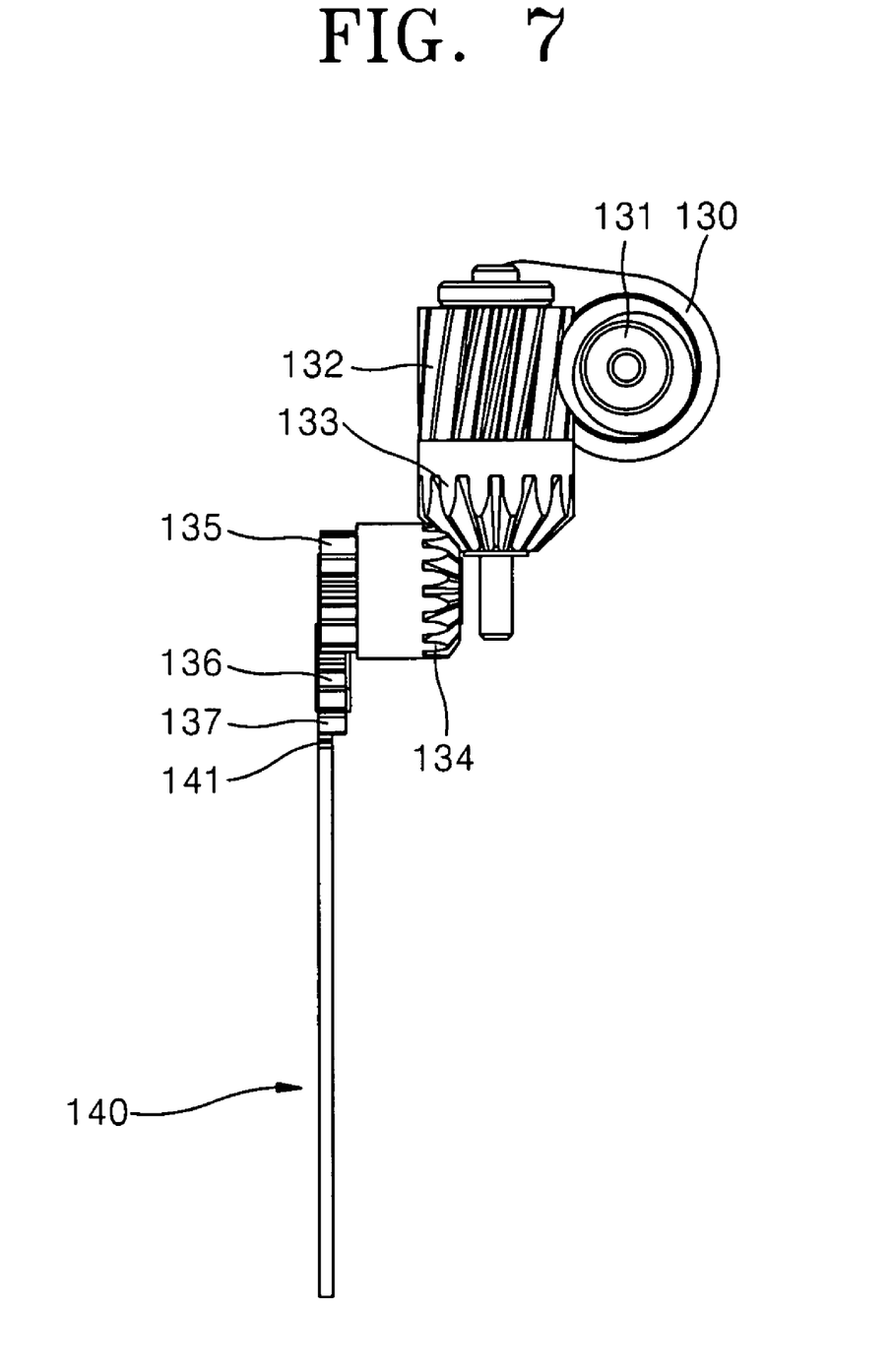
FIG. 7 is a side view of FIG. 6.

The process of transfer of power from the zoom motor 130 to the plane cam member 140 will be described with reference to FIGS. 6 and 7. FIG. 6 is a front view showing a zoom motor, a gear train, and a plane cam member of the optical module according to an embodiment of the present invention. FIG. 7 is a side view of FIG. 6.

A worm 131 is inserted around the shaft 130a of the zoom motor 130. A worm wheel 132 is arranged to be engaged with the worm 131 perpendicular to the direction of the shaft 130a of the zoom motor 130. A first bevel gear 133 is installed on a shaft of the worm wheel 132. A second bevel gear 134 is engaged with the first bevel gear 133. A first spur gear 135 is installed on a shaft of the second bevel gear 134. A second spur gear 136 is engaged with the first spur gear 135. A third spur gear 137 is engaged with the second spur gear 136.

Also, the gear unit 141 of the plane cam member 140 is engaged with the third spur gear 137 so that power is transmitted from the shaft 130a of the zoom motor 130 to the gear unit 141 of the plane cam member 140. When the power is transmitted to the plane cam member 140, the plane cam member 140 is rotated around the rotation center hole 144 and the fixing pin 196a as indicated by an arrow shown in FIG. 6. Then, the first guide protrusion 112b and the second guide protrusion 122b slide along the first and second cam slots 142 and 143 so that the distance between the first and second lens group members 110 and 120 changes, thus performing the zoom operation.

Figure 8:
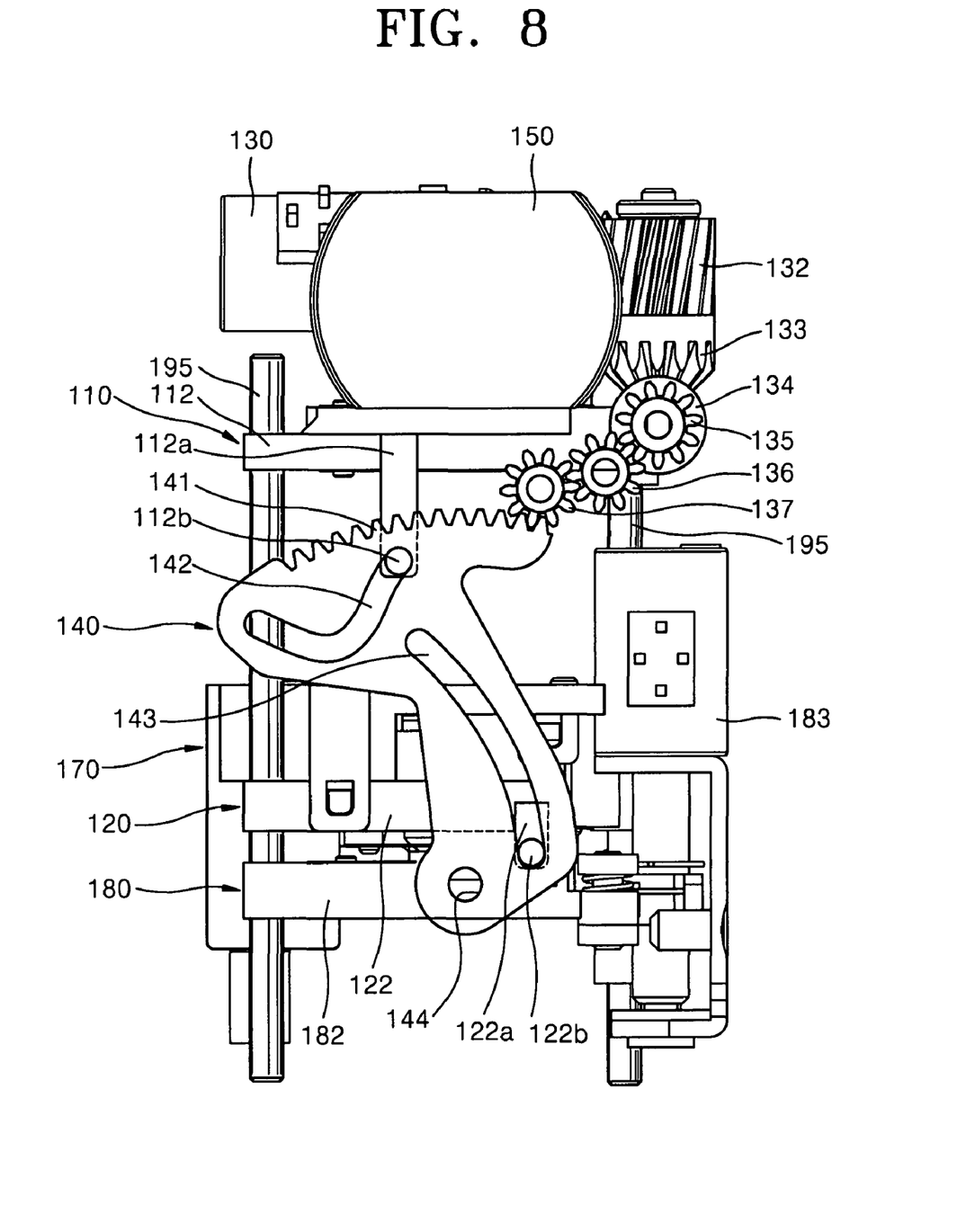
FIG. 8 is a view showing that the optical module according to an embodiment of the present invention is in a wide mode.
Figure 9:
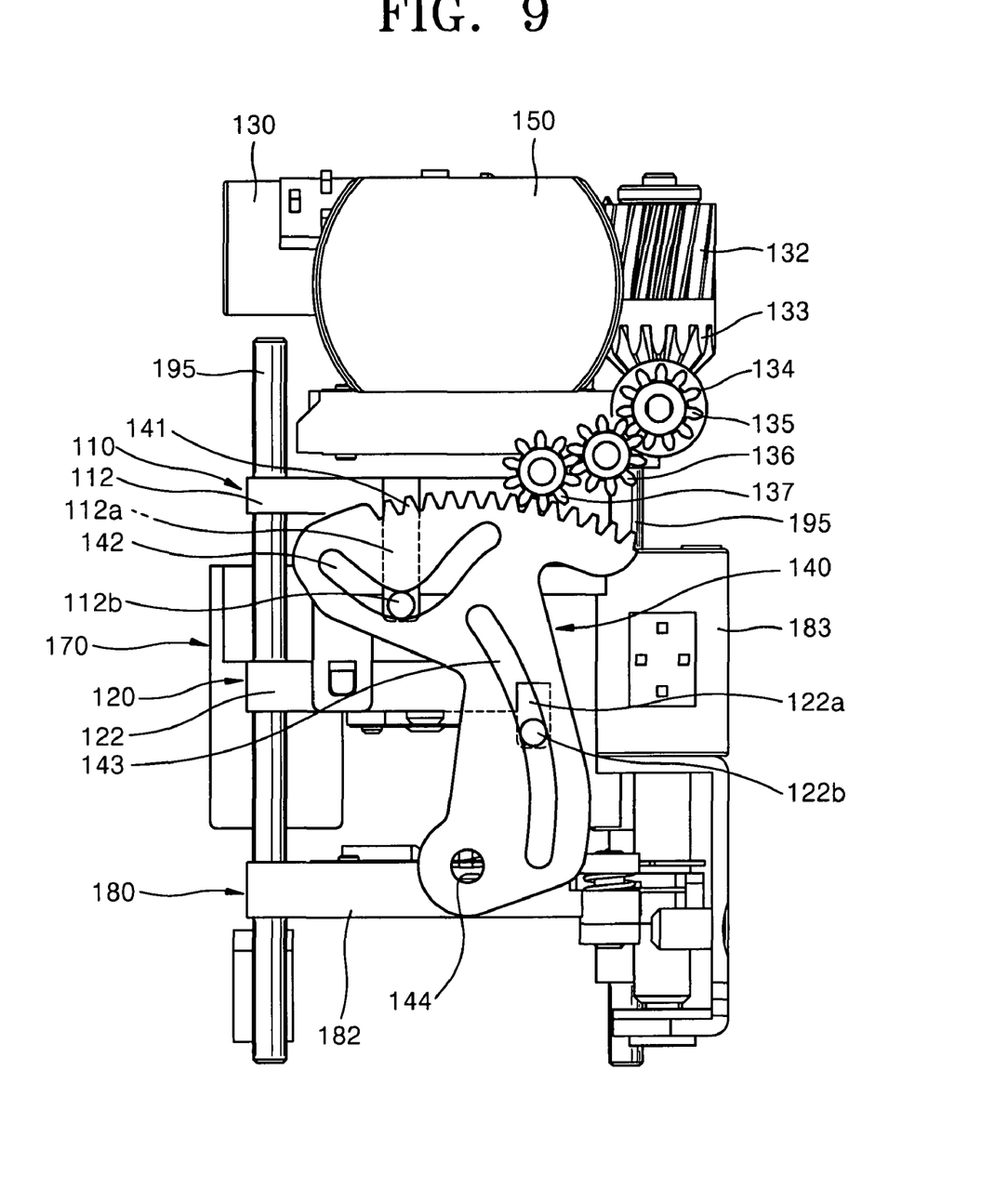
FIG. 9 is a view showing that the optical module according to an embodiment of the present invention is in a middle mode.
Figure 10:
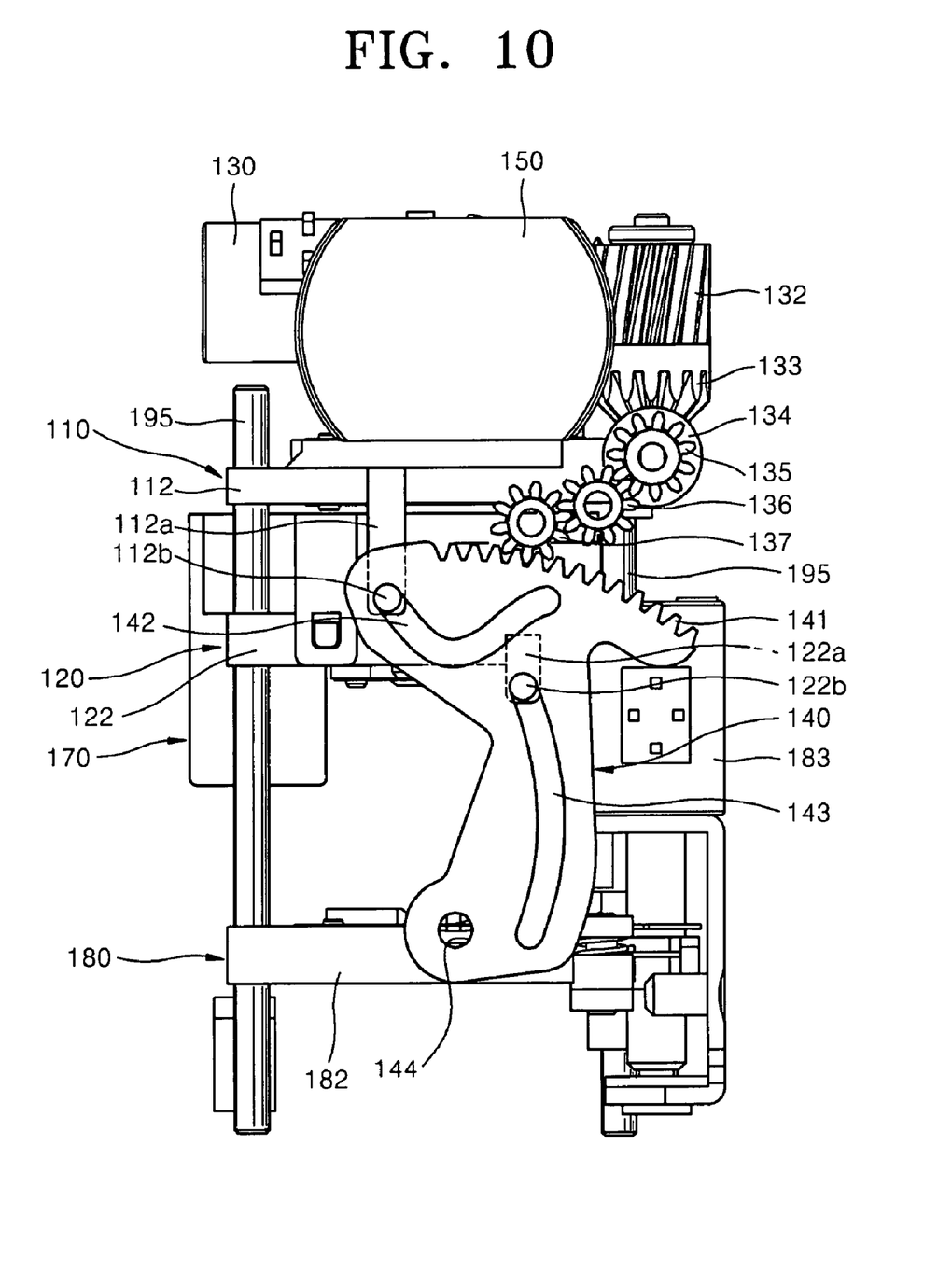
FIG. 10 is a view showing that the optical module according to an embodiment of the present invention is in a tele mode.

The driving operation of the optical module according to an embodiment of the present invention will be described with reference to FIGS. 8 through 10. As discussed above, FIG. 8 is a view showing that the optical module according to an embodiment of the present invention is in a wide mode. FIG. 9 is a view showing that the optical module according to an embodiment of the present invention is in a middle mode. FIG. 10 is a view showing that the optical module according to an embodiment of the present invention is in a tele mode.

When a user turns on the switch of the photographing apparatus 10, an initialization operation starts. The initialization operation means that, when the zoom motor 130 is driven to rotate the third spur gear 137 clockwise, the gear unit 141 engaged with the third spur gear 137 counterclockwise so that the plane cam member 140 rotates counterclockwise. The initialization operation ends when the distance between the first and second lens group members 110 and 120 becomes maximum as the first guide protrusion 112*b* is located at the end portion in the upper right side of the first cam slot 142 and the second guide protrusion 122*b* is moved to the lower end portion of the second cam slot 143. The positional state of the optical module 100 is referred to a wide-angle extremity which is used when an object is photographed at a wide angle.

When the user intends to photograph the object located at a remote position by zooming the object in at a narrow angle, a zoom switch (not shown) is operated to drive the zoom motor 130 to rotate the third spur gear 137 counterclockwise. Then, the gear unit 141 engaged with the third spur gear 137 is moved clockwise so that the plane cam member 140 rotates clockwise.

In this case, the first guide protrusion 112*b*, as shown in FIG. 9, is moved to the lower left side of the first cam slot 142 and passes through a curve point at the lowest portion of the first cam slot 142. Then, as shown in FIG. 10, the first guide protrusion 112*b* is moved to the upper left side of the first cam slot 142 to arrive at the upper left end thereof. In the meantime, the second guide protrusion 122*b* ascends along the second cam slot 143 to arrive at the upper end portion of the second cam slot 143. Consequently, as the first and second guide protrusions 112*b* and 122*b* are moved as described above, the distance between the first and second lens group members 110 and 120 becomes minimum as shown in FIG. 10. The positional state of the optical module 100 in this state is referred to as a telephoto extremity.

As described above, according to the optical module 100 configured according to the embodiments of the present embodiment as described above, the design, manufacturing, and assembly are simplified and space can be efficiently used. Thus, a slim photographing device can be manufactured.

Figure 11:
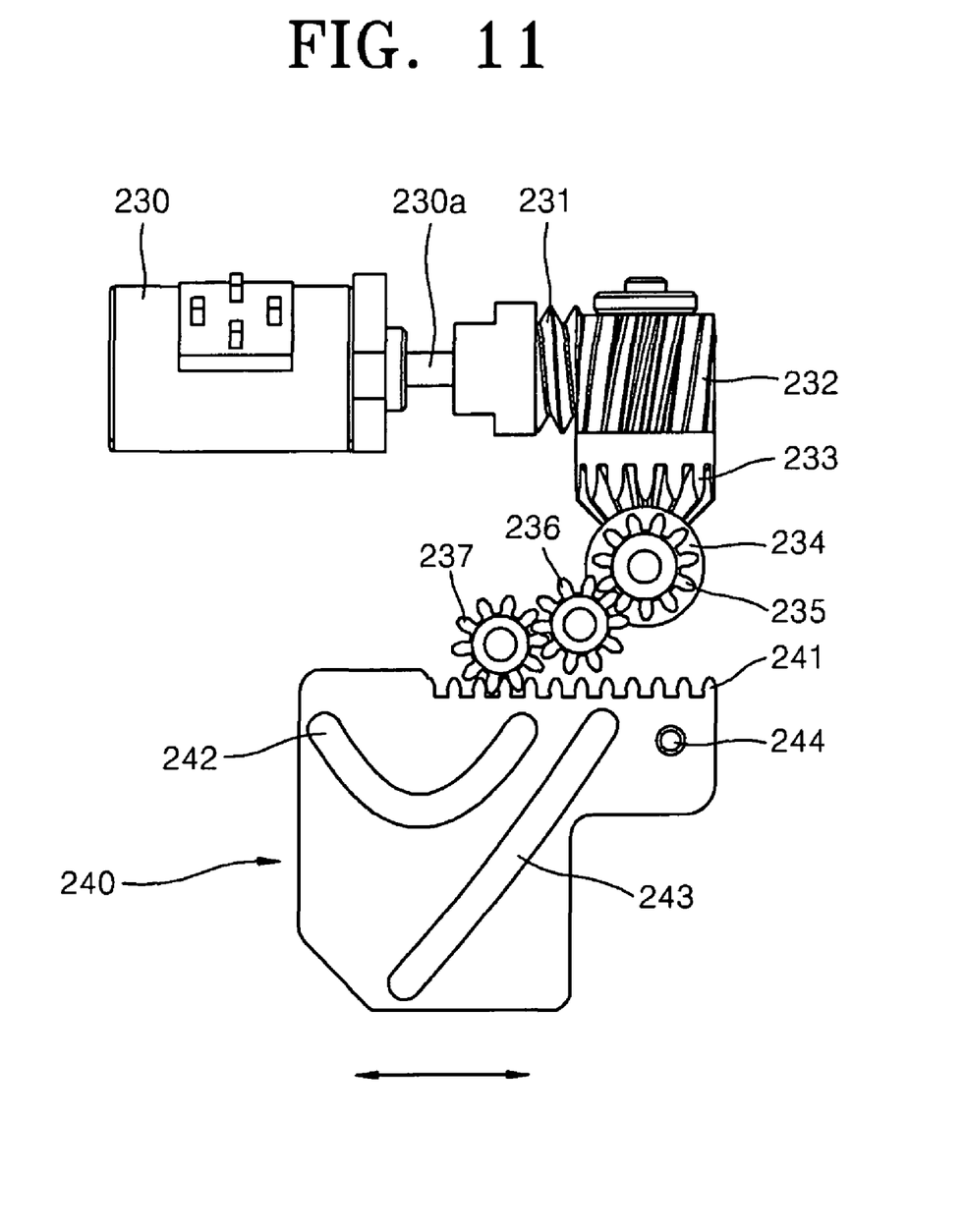
FIG. 11 is a front view of a zoom motor, a gear train, and a plane cam member of an optical module according to another embodiment of the present invention.
Figure 12:
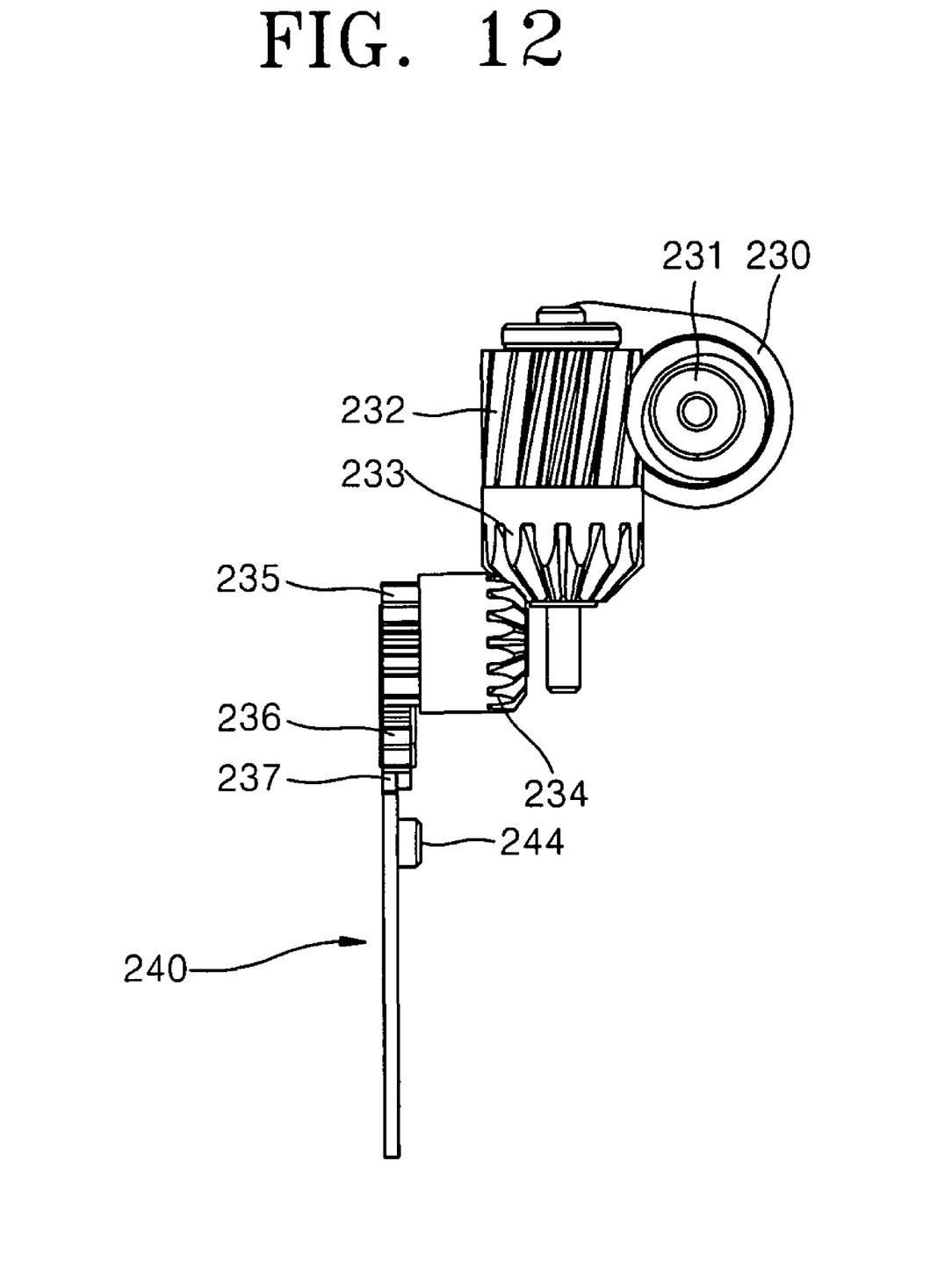
FIG. 12 is a side view of FIG. 11.

The structure of a plane cam member according to another embodiment of the present invention will be described with reference to FIGS. 11 and 12, mainly focusing on the differences from the above-described embodiment. FIG. 11 is a front view of a zoom motor, a gear train, and a plane cam member of an optical module according to another embodiment of the present invention. FIG. 12 is a side view of FIG. 11.

A worm 231 is inserted around a shaft 230*a* of a zoom motor 230. A worm wheel 232 is arranged to be engaged with the worm 231 perpendicular to the direction of the shaft 230*a* of the zoom motor 230. A first bevel gear 233 is installed on a shaft of the worm wheel 232. A second bevel gear 234 is engaged with the first bevel gear 233. A first spur gear 235 is installed on a shaft of the second bevel gear 234. A second spur gear 236 is engaged with the first spur gear 235. A third spur gear 237 is engaged with the second spur gear 236.

Also, a gear unit 241 of a plane cam member 240 is engaged with the third spur gear 237 so that power is transmitted from the shaft 230*a* of the zoom motor 230 to the gear unit 241 of the plane cam member 240. In the present embodiment, the gear unit 241 is embodied by a rack gear.

When the power is transmitted to the plane cam member 240, unlike the rotational operation of the plane cam member 140 in the above-described embodiment, the plane cam member 240 is moved linearly in the horizontal direction. Then, a first guide protrusion (not shown) and a second guide protrusion (not shown) are respectively inserted in first and second cam slots 242 and 243 slide along the first and second cam slots 242 and 243 so that the distance between the first and second lens group members 110 and 120 changes, thus performing the zoom operation.

A cam guide protrusion 244 is formed on the plane cam member 240, inserted in a horizontal guide slot (not shown) formed in a frame (not shown) where the optical module is installed, and perform a function of guiding the motion of the plane cam member 240 in the horizontal direction. Since the other structure, operation, and effect of the optical module according to this present embodiment are substantially the same as those of the optical module according to the above-described embodiments, the descriptions thereon will be omitted herein.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical module for a photographing apparatus, the optical module comprising:
   a fixed lens group member arranged along a first optical axis direction that faces an object to be photographed;
   a reflection member arranged in the rear of the fixed lens group member and outputting an image light of the object to be photographed in a second optical axis direction perpendicular to the first optical axis direction by reflecting incident image light;
   a first lens group member comprising a first lens group arranged along the second optical axis direction and a first edge unit supporting the first lens group and comprising a first guide protrusion;
   a second lens group member comprising a second lens group arranged separated from the first lens group along the second optical axis direction and a second edge unit supporting the second lens group and comprising a second guide protrusion;
   a zoom motor for providing power to change a distance between the first and second lens group members and thus perform a zoom operation on the image light input to an imaging device for photographing;
   a plane cam member comprising a gear unit formed in a part of an edge of the plane cam member to receive the power from the zoom motor, a first cam slot in which the first guide protrusion is inserted to slide therein so as to move the first lens group member, and a second cam slot in which the second guide protrusion is inserted to slide therein so as to move the second lens group member, wherein at least one of the first cam slot and the second cam slot of the plane cam member moves in a plane transverse to a tooth of the gear unit; and
   a frame where the plane cam member is installed.

2. The optical module of claim 1, wherein the first and second guide protrusions are formed in the same direction.

3. The optical module of claim 1, wherein a shutter is installed on the second lens group member.

4. The optical module of claim 1, wherein an iris is installed on the second lens group member.

5. The optical module of claim 1, wherein at least one power transmission gear to transmit power is arranged between a shaft of the zoom motor and the gear unit.

6. The optical module of claim 5, wherein the power transmission gear comprises at least one of the following: a worm gear, a bevel gear, a spur gear, and a helical gear.

7. The optical module of claim 1, wherein the zoom motor is arranged in the rear of the reflection member with respect to the first optical axis direction.

8. The optical module of claim 1, wherein the shaft of the zoom motor is arranged in a direction perpendicular to the first and second optical axis directions.

9. The optical module of claim 1, further comprising at least one guide rod arranged parallel to the second optical axis direction, a first guide groove formed at the first edge unit to be inserted around the guide rod capable of sliding, and a second guide groove formed at the second edge unit to be inserted around the guide rod capable of sliding, to guide the first and second lens group members to move in the second optical axis direction.

10. The optical module of claim 1, further comprising at least one guide rod arranged parallel to the second optical axis direction, a first guide hole formed at the first edge unit to be inserted around the guide rod capable of sliding, and a second guide hole formed at the second edge unit to be inserted around the guide rod capable of sliding, to guide the first and second lens group members to move in the second optical axis direction.

11. The optical module of claim 1, wherein the first cam slot has a shape of "U".

12. The optical module of claim 1, wherein the second cam slot has a shape of an arc having a predetermined curvature.

13. The optical module of claim 1, wherein the cam member is installed on the frame in a hinge structure to perform a rotational motion during a zoom operation.

14. The optical module of claim 1, wherein the cam member is installed on the frame in a structure capable of sliding to perform a sliding motion during a zoom operation.

15. The optical module of claim 1, wherein a direction perpendicular to a plane of the plane cam member faces an object to be photographed.

16. The optical module of claim 1, wherein a third lens group member assisting a zoom operation and transferred by a device separate from the zoom motor is additionally arranged in the rear of the second lens group member with respect to the second optical axis direction.

17. The optical module of claim 6, comprising a plurality of the power transmission gears comprising a worm gear, a bevel gear, a spur gear, and a helical gear.

18. The optical module of claim 1, wherein the second cam slot is substantially linear.

19. A photographing apparatus comprising an optical module according to claim 1.

20. The optical module of claim 1, wherein the fixed lens group member comprises a single lens.

21. An optical module for a photographing apparatus, the optical module comprising:
  a fixed lens group member arranged along a first optical axis direction that faces an object;
  a reflection member arranged in the rear of the fixed lens group member and outputting an image light in a second optical axis direction perpendicular to the first optical axis direction by reflecting incident image light;
  a first lens group member comprising a first lens group arranged along the second optical axis direction and a first edge unit supporting the first lens group and comprising a first guide protrusion;
  a second lens group member comprising a second lens group arranged separated from the first lens group along the second optical axis direction and a second edge unit supporting the second lens group and comprising a second guide protrusion;
  a zoom motor for providing power to change a distance between the first and second lens group members;
  a cam member comprising a gear unit formed in a part of an edge to receive the power from the zoom motor, a first cam slot in which the first guide protrusion is inserted to slide therein so as to move the first lens group member, and a second cam slot in which the second guide protrusion is inserted to slide therein so as to move the second lens group member; and
  a frame where the cam member is installed,
  wherein a diameter of the zoom motor is less than the height of the fixed lens group member,
  wherein the gear unit is formed in a part of an edge of the cam member, and
  wherein at least one of the first cam slot and the second cam slot of the cam member moves in a plane transverse to a tooth of the gear unit.

22. The optical module of claim 1, wherein a diameter of the zoom motor is less than the height of the fixed lens group member.

* * * * *